United States Patent [19]

Bender et al.

[11] Patent Number: 5,700,507
[45] Date of Patent: Dec. 23, 1997

[54] PROCESS FOR TREATING RED MEAT, POULTRY AND SEAFOOD TO CONTROL BACTERIAL CONTAMINATION AND/OR GROWTH

[75] Inventors: Fredric G. Bender, McMurray; Charles Mostoller, Langhorne; Evelyn Marie Frankovich, Burgettstown, all of Pa.

[73] Assignee: Rhone-Poulenc Inc., Cranbury, N.J.

Related U.S. Application Data

[60] Provisional application No. 60/001,301 Jul. 21, 1995.

[21] Appl. No.: 644,552

[22] Filed: May 10, 1996

[51] Int. Cl.$^6$ .............................. A23L 3/34; A22C 21/00
[52] U.S. Cl. ........................ 426/332; 426/335; 426/532; 426/644
[58] Field of Search ............................ 426/332, 335, 426/532, 644

[56] References Cited

U.S. PATENT DOCUMENTS

| | | |
|---|---|---|
| Re. 30,023 | 6/1979 | Hawley et al. . |
| 1,774,310 | 8/1930 | Bates . |
| 2,770,548 | 11/1956 | Hall et al. . |
| 2,957,770 | 10/1960 | Freund et al. . |
| 3,493,392 | 2/1970 | Swartz . |
| 3,615,686 | 10/1971 | England . |
| 3,620,767 | 11/1971 | Swartz . |
| 3,681,091 | 8/1972 | Kohl et al. . |
| 3,705,040 | 12/1972 | Bynagte . |
| 3,726,962 | 4/1973 | Vanstrom et al. . |
| 3,775,543 | 11/1973 | Zyss . |
| 3,782,975 | 1/1974 | Zyss . |
| 3,989,851 | 11/1976 | Hawley et al. . |
| 4,071,635 | 1/1978 | Lindl et al. . |
| 4,075,357 | 2/1978 | Szczesniak et al. . |
| 4,168,322 | 9/1979 | Buckley et al. . |
| 4,293,578 | 10/1981 | Stone . |
| 4,342,790 | 8/1982 | Katoh et al. . |
| 4,382,098 | 5/1983 | Bolin et al. . |
| 4,407,831 | 10/1983 | Swartz . |
| 4,431,679 | 2/1984 | Crawford . |
| 4,517,208 | 5/1985 | Crawford . |
| 4,592,892 | 6/1986 | Ueno et al. . |
| 4,683,139 | 7/1987 | Cheng . |
| 4,683,618 | 8/1987 | O'Brien . |
| 4,770,784 | 9/1988 | Davis et al. . |
| 4,781,934 | 11/1988 | Shimp et al. . |
| 4,810,514 | 3/1989 | Guenther . |
| 4,849,237 | 7/1989 | Hurst . |
| 5,069,922 | 12/1991 | Brotsky et al. . |
| 5,143,739 | 9/1992 | Bender et al. . |
| 5,192,570 | 3/1993 | Bender et al. . |
| 5,268,185 | 12/1993 | Bender et al. . |
| 5,283,073 | 2/1994 | Bender et al. . |

FOREIGN PATENT DOCUMENTS

| | | |
|---|---|---|
| 847280 | 7/1970 | Canada . |
| 935413 | 8/1963 | United Kingdom . |
| 1339503 | 12/1973 | United Kingdom . |

OTHER PUBLICATIONS

"Effects of Tpe and Concentration of Phosphate and Amount of Salt and Brine on WHC, Color and Consistency of Cooked Meat Products," G. Barbieri, et al., Industria Conserve 1989, 64:313.

"The Influence of Scald Water pH on the Death Rates of *Salmonella typhimurium* and Other Bacteria Attached to Chicken Skin," T.J. Humphrey, et al., Journal of Applied Bacteriology 1984, 57(2), pp. 355–359.

"The Effect of pH Adjustment on the Microbiology of Chicken Scald-tank Water with Particular Reference to the Death Rate of Salmonellae," T.J. Humphrey, et al., Journal of Applied Bacteriology 1981, 51, pp. 517–527.

"Phosphate and Heat Treaments to Control Salmonella and Reduce Spoilage and Rancidity on BroilerCarcasses," J.E. Thompson, et al., Poultry Science 1979, 58, pp. 139–143.

*Chemical Pasteurization of Poultry Meat*, J.S. Teotia, Dissertation Abstracts Int'l. B. 1974, 34(a), p. 4142.

*The Antimicrobial Effect of Phosphate With Particular Reference to Food Products*, L.L. Hargreaves, et al., The British Food Manufacturing Industries Research Association, Scientific and Technical Surveys, No. 76, Apr. 1972, pp. 1–20 at 12.

Grant, Hackh's Chemical Dictionary, 4th edition, McGraw Hill Company, New York, 1969, p. 514.

"Chemicals Used in Food Products," National Academy of Sciences, National Research Counsel, Publication 1 274 (1965).

Primary Examiner—Deborah Yee
Attorney, Agent, or Firm—Andrew M. Solomon

[57] ABSTRACT

A process for treating animals and/or seafood comprising the step of contacting the animal and/or seafood with a treatment solution containing trialkali metal orthophosphate at a temperature of between about 90° F. and about 200° F. for a time period effective to remove, reduce or retard bacterial contamination without significantly depreciating the organoleptic properties of the animal and/or seafood is provided.

14 Claims, No Drawings

PROCESS FOR TREATING RED MEAT, POULTRY AND SEAFOOD TO CONTROL BACTERIAL CONTAMINATION AND/OR GROWTH

This application claims the benefit under 35 U.S.C. Section 119(e) of United States Provisional Application Ser. No. 60/001,301, filed Jul. 21, 1995.

The present invention relates an improved process for reducing the level of and retarding the growth of bacteria, on newly slaughtered raw red meat carcasses, poultry carcasses or seafood without causing organoleptic depreciation thereof. The process selected is using a hot trialkali metal orthophosphate aqueous solution.

BACKGROUND OF THE INVENTION

The invention relates to a treatment step made during slaughter of fresh meat and more particularly to treating pork, beef, veal, mutton, lamb and goat carcasses with a hot aqueous solution of alkali metal orthophosphate to remove, retard or reduce bacterial contamination and/or growth without causing substantial organoleptic depreciation of the meat. In addition, the invention also relates to the use of such solutions on seafood and poultry.

The applicants' assignee has obtained a number of United States patents directed to the use of aqueous solutions of trialkali metal orthophosphate, preferably trisodium orthophosphate, to treat red meat, poultry and seafood. These include the following: U.S. Pat. Nos. 5,069,022; 5,143,739; 5,192,570; 5,262,186; 5,268,185; 5,283,073; and 5,354,568. Each of these patents is characterized by including a treatment step wherein at least a four percent aqueous solution of trialkali metal orthophosphate is used.

The combination of hot water with phosphates as a way to reduce bacterial contamination of poultry has been reported in Thomson et al., "Phosphate and Heat Treatments to Control Salmonella and Reduce Spoilage and Rancidity on Broiler Carcasses", Poultry Science 58:139-143 (1979). The phosphates used in the evaluation are sodium tripolyphosphate and sodium hexametaphosphate.

The use of hot scald water having a pH of about 9 to reduce contamination of poultry has been reported in Humphrey et al., "The Effect of pH Adjustment on the Microbiology of Chicken Scald-tank Water with Particular Reference to the Death Rate of Salmonelias", Journal of Applied Bacteriology, 51:517-527 (1981). The basic chemicals used to adjust samples of the scalding water to a pH of about 8.8 were sodium and potassium hydroxide, sodium carbonates and tri-sodium phosphate.

Different methods for the pasteurization of poultry meat are discussed in Teotia, "Chemical Pasteurization of Poultry Meat", Ph.D. Thesis, Colorado State University, 1973. Various treatments are described in the thesis including the testing of sodium carbonate, sodium borate or potassium hydroxide solutions at elevated temperatures and testing involving the use of only hot water.

It would be desirable to achieve effective bacterial reduction while potentially reducing the amount of trialkali metal orthophosphate used and by using a treatment means in addition to the trialkali metal orthophosphate treatment. In accordance with this invention it is possible to achieve this result by utilizing an elevated temperature trialkali metal orthophosphate solution.

SUMMARY OF THE PRESENT INVENTION

In accordance with the present invention, there is provided a process for treating red meat carcasses (including parts and organs), poultry carcasses (including parts and organs) and seafood to remove, reduce or retard bacterial growth, such as salmonella, campylobacter, $E.$ $coil$, and spoilage bacteria, without significantly affecting the organoleptic properties of the meat. The process comprises surface treating the red meat carcasses, poultry carcasses or seafood with a hot aqueous solution of trialkali orthophosphate, preferably above pH 11.5 without significantly changing the color of the surface being treated resulting from high pH. More particularly, the treatment solution is between about 90° and about 200° F., and the concentration of trialkali metal orthophosphate in the solution ranges from about 0.1 percent to saturation.

The treatment is preferably conducted during slaughter either prior to or after chilling by dipping or preferably spraying the hot orthophosphate solution onto all surfaces of the carcass for one second to thirty minutes. In the case of red meat, preferably treatment is done before rigor on set. In the case of poultry, treatment is preferably done before chilling.

Specifically, it has been discovered that carcasses can be treated with from about 0.1% to saturation of a hot aqueous solution of trisodium or tripotassium orthophosphate dodecahydrate or an equivalent amount of the anhydrous compound.

By use of this process the carcasses can be treated economically and simply with a food grade product to achieve salmonella and other bacteria control without organoleptic depreciation of the carcass and organs.

An object of the present invention is to provide a method for reducing bacteria on red meat, seafood and poultry carcasses.

Still another object of the present invention is to provide a method for reducing bacteria on red meat, seafood and poultry carcasses which utilizes minimal amounts of treatment solutions.

These, and other objects, will readily be apparent to those skilled in the art as reference is made to the detailed description of the preferred embodiment.

DETAILED DESCRIPTION OF THE INVENTION

In describing the preferred embodiment, certain terminology will be utilized for the sake of clarity. Such terminology is intended to encompass the recited embodiment, as well as all technical equivalents which operate in a similar manner for a similar purpose to achieve a similar result.

The present invention involves using a treatment to reduce bacterial contamination of an animal carcass. The treatment comprises contacting a surface of an animal, poultry or seafood with an aqueous trialkali metal orthophosphate solution at elevated temperatures.

The invention is applicable to any red meat including pork, beef, veal, mutton, lamb and goat either whole carcass or fresh parts, including internal organs such as hearts, kidneys and livers, preferably before rigor. This invention is further applicable to any poultry carcass or fresh parts, including internal organs such as hearts, kidneys and livers, including but not limited to chicken, turkey, hen squab, duck, quail, and the like, or any type of seafood including but not limited to shellfish, fresh water fish, and sea water fish.

The carcass surface and/or organs is treated with a trialkali metal orthophosphate either before, during or after chilling. The carcass is treated with a hot treatment solution containing from about 0.10% to saturation, preferably from about 0.5% and more preferably from about 1% to saturation of trialkali metal orthophosphate by weight of solution at temperatures ranging from about 90° F. to about 200° F.

From about 0.25% to 20%, preferably 0.5–15%, and most preferably from about 1.0% to 12% (including 1, 2, 4, 6, 8, 10 and 12 percent solutions) of trialkali metal orthophosphate can be effective. The temperature is preferably between 100° and 180° F., more preferably between 125° and 175° F. and most preferably between 140° and 160° F. Trialkali metal phosphate is an orthophosphate salt of the formula $R_3PO_4$ with a formula for the sodium salt being $Na_3PO_4$ and an equivalent formula for the tripotassium compounds. R is an alkali metal of sodium or potassium. Trisodium phosphate has a minimum of 41.5% $P_2O_5$ and a typical pH in a 1% solution of about 11.8.

Trisodium phosphate is available as the dodecahydrate and in commerce the dodecahydrate is available in technical or food grade. Preferably the dodecahydrate (either form) is used. As used herein trisodium phosphate is intended to include tripotassium phosphate as well as all forms of those compounds.

The carcass can be dipped in the treatment solution preferably with solution agitation to increase contact of the treatment solution with all surfaces and crevices of the carcass, including the internal organs. The treatment solution is preferably applied by mechanical sprayers, usually under high pressure to insure good contact of the treatment solution with the surface. The treatment solution preferably contains only trialkali metal orthophosphate as the means to control, reduce, retard or remove bacteria. No alcohol, nitrate or nitrite, or ascorbic acid is employed in the treatment solution for purposes of enhancing the effect of the orthophosphate. The treatment solution may contain other ingredients for water binding, cleaning, flavoring, coloring and the like. Salts may be used, including chlorides and the like.

Normally, except in pumping solutions, other phosphates are not combined with the orthophosphate.

In the case of treating poultry carcasses it is preferred to employ the trialkali orthophosphate treatment immediately after the scalding treatment either before or after defeathering or during washing of the poultry prior to evisceration or preferably during the inside/outside wash after evisceration. These treatments are conducted using a warm or hot solution as defined above and recycling the solution with filtering to economically utilize the phosphate.

In the case of treating red meat it is preferably treated with the trialkali metal orthophosphate either before or directly after skinning and usually prior to chilling. In particularly preferred embodiments, the treatment is performed pre rigor.

In the case of seafood the treatment with the trialkali metal orthophosphate can occur at any stage of processing, such as during shell, skeleton, head, viscera, scale or skin removal or prior to, during or after freezing, refrigeration, icing, ice glazing, cooking or pasteurization. Preferably the seafood is treated either just after catch on the fishing boat or shortly after arrival at the processing plant prior to cooking or packaging. It is particularly preferred to use the treatment solution after evisceration and during washing or after washing the flesh.

The treatment solution is preferably comprised of trialkali metal orthophosphate in an amount sufficient to provide a pH above about 11.5 and preferably within a range from 11.6 to 13.5 and most preferably from about pH 12 to pH 13.5.

At atmospheric pressure, in a dip tank, dwell times from 5 seconds to about 30 minutes are effective, while dwell times using a spray range from several seconds to several minutes or 2 seconds to 15 minutes with spray times of less than 30 seconds preferred.

The high pH of over 11.5 preferably about pH 12 or above is critical to remove, reduce or retard bacterial contamination or growth. The mechanism is not entirely understood, but the orthophosphate appears to improve bacterial removal as well as retarding growth of any residual bacteria.

The treatment time, concentration and temperature are selected such that the organoleptic properties of the animal or seafood being treated do not appreciably change. For example, when treating beef samples at elevated temperatures some slight discoloring may occur, but not enough to effect the overall taste, appearance and the like.

The treatment solution may also include other alkaline materials such as carbonates and hydroxides. Specific examples include sodium hydroxide, potassium hydroxide, sodium carbonate, potassium carbonate, sodium tripolyphosphate and mixtures thereof. Typically the other alkaline materials constitute between about 0 and about 50 percent by weight of the treatment solution.

We have found that the trialkali metal orthophosphate treatment solution is effective against salmonella, campylobacter, E. coli, spoilage bacteria and the like. It is also hypothesized by the inventors that elevated temperature aqueous trialkali metal orthophosphate solution may increase the shelf-life of the resulting poultry, red meat or seafood. Increases of about one to about fourteen days may be achieved by utilizing the inventive method.

The invention is further described in the following non-limiting Example.

EXAMPLE I

Different concentrations of trisodium orthophosphate (dodecahydrate) are used to determine the efficacy against E. coli 0157:h7 at two different temperatures. The sample used to test efficacy are beef goose neck rounds purchased from a grocery store which are then inoculated with E. coli 0157:H7 strains (both clinical isolates and beef isolates) at about 70° F. The inoculated beef rounds are then subjected to spray tunnel rinsing with trisodium orthophosphate solutions of different percentage concentrations (0, 0.25, 0.50, 1, 2, 4, 6, and 10%) at both 80° F. and 150° F. (plus or minus 5° F. for each sample). The tests are completed on two replications for two runs. Results are shown in the following table (Table 1 ). Each numerical value represents the most probable numbers of E. coli 0157:H7 bacteria recovered per 25 $cm^2$ beef samples.

TABLE 1

| Treatment/ | First Run | | Second Run | | |
|---|---|---|---|---|---|
| Temperature | Rep. #1 | Rep. #2 | Rep. #1 | Rep. #2 | Average |
| Inoculated Control | 4,300 | 24,000 | 2,300 | 4,300 | 8,700 (3.94)* |
| 10% TSP at 80° F. | 93 | 23 | 93 | 93 | 76 (1.88)* |
| 10% TSP at 150° F. | 43 | 43 | 240 | 43 | 92 (1.96)* |
| 6% TSP at 150° F. | 43 | 43 | 43 | 93 | 56 (1.75)* |
| 4% TSP at 150° F. | 93 | 93 | 9.1 | 23 | 55 (1.74)* |
| 2% TSP at 150° F. | <3 | 9.1 | 240 | 15 | <67 (<1.83)* |
| 1% TSP at 80° F. | 930 | 230 | 430 | 430 | 510 (2.71)* |
| 1% TSP at 150° F. | 43 | 3.6 | 14 | 15 | 19 (1.28)* |
| 0.5% TSP at 150° F. | 23 | 43 | 43 | 9.1 | 30 (1.43)* |
| 0.25% TSP at 80° F. | 93 | 930 | 230 | 2,400 | 910 (2.96)* |
| 0.25% TSP at 150° F. | 43 | 43 | 93 | 43 | 56 (1.76)* |
| Water | 29 | 460 | 15 | 29 | 130 |

TABLE 1-continued

| Treatment/ | First Run | | Second Run | | |
|---|---|---|---|---|---|
| Temperature | Rep. #1 | Rep. #2 | Rep. #1 | Rep. #2 | Average |
| at 150° F. | | | | | (2.11)* |
| Water at 80° F. | 430 | 930 | 150 | 93 | 400 (2.60)* |

*Numbers in parentheses are the corresponding $\log_{10}$ of CPU recovered.

EXAMPLE 2

The Experiments are repeated using the above protocol with the following parameters: Concentration of TSP: 0, 0.25, 1.0, and 10% by weight aqueous solutions Temperature: 80°, 110°, 140°, 170° and 200° F. (±5° F.)

The results are shown in the following table (Table 2). Each numerical value represents the most probable numbers of E. coli 0157:H7 bacteria recovered per 25 cm² beef samples.

TABLE 2

| Treatment/ | First Run | | Second Run | | |
|---|---|---|---|---|---|
| Temperature | Rep. #1 | Rep. #2 | Rep. #1 | Rep. #2 | Average |
| Inoculated Control | 15,000 | 24,000 | 24,000 | 46,000 | 27,000 (4.43)* |
| 0% TSP at 80° F. | 2,900 | 430 | 1,200 | 91 | 1,200 (3.08)* |
| 0% TSP at 110° F. | 2,300 | 75 | 43 | 43 | 620 (2.79)* |
| 0% TSP at 140° F. | 43 | 210 | 93 | 15 | 90 (1.95)* |
| 0% TSP at 170° F. | 240 | 44 | 20 | 93 | 99 (1.99)* |
| 0% TSP at 200° F. | 43 | 43 | 3.6 | 23 | 28 (1.45)* |
| 0.25% TSP at 80° F. | 110 | 150 | <30 | 150 | <110 (<2.04)* |
| 0.25% TSP at 110° F. | 150 | 430 | 43 | 28 | 160 (2.21)* |
| 0.25% TSP at 140° F. | 28 | 43 | 43 | 75 | 47 (1.67)* |
| 0.25% TSP at 170° F. | 9.1 | 3.6 | 9.1 | 3.6 | 6.4 (0.81)* |
| 0.25% TSP at 200° F. | 43 | <3 | 3.6 | 23 | M18 (<1.26)* |
| 1% TSP at 80° F. | 930 | 2,400 | 73 | 930 | 1,100 (3.04)* |
| 1% TSP at 110° F. | 210 | 930 | 43 | 3.6 | 300 (2.47)* |
| 1% TSP at 140° F. | 15 | 93 | 230 | 7.3 | 86 (1.94)* |
| 1% TSP at 170° F. | 93 | 35 | 20 | <3 | <38 (<1.58)* |
| 1% TSP at 200° F. | 23 | <3 | 9.1 | 3.6 | <9.7 (<0.99)* |
| 10% TSP at 80° F. | — | — | 430 | 930 | 680 (2.83)* |
| 10% TSP at 110° F. | 230 | 11 | 150 | <3 | <99 (<1.99)* |
| 10% TSP at 140° F. | 43 | <3 | <3 | 230 | <70 (<1.84)* |
| 10% TSP at 170° F. | 9.1 | 9.1 | <3 | <3 | <6.1 (<0.78)* |
| 10% TSP at 200° F. | <3 | <3 | <3 | <3 | <3 (<0.48)* |

*Numbers in parentheses are the corresponding $\log_{10}$ of CPU recovered.

The above data demonstrates that the combination of hot water and trialkali metal orthophosphate is effective to reduce bacterial contamination, even at trialkali metal orthophosphate levels of as low as 0.25 percent.

Having described the invention in detail and by reference to the preferred embodiments thereof, it will be apparent that modifications and variations are possible without departing from the scope of the appended claims.

What is claimed is:

1. A process for treating animals and/or seafood comprising the step of contacting the animal and/or seafood with a treatment solution containing trialkali metal orthophosphate at a temperature of between about 90° F. and about 200° F. for a time period effective to remove, reduce or retard bacterial contamination without significantly depreciating the organoleptic properties of the animal and/or seafood and wherein the concentration of said trialkali metal orthophosphate in said solution is between less than about 0.1 to about 4.0 percent by weight.

2. The process according to claim 1 wherein the concentration of trialkali metal orthophosphate in said solution is from about 0.25 percent by weight to less then about 4.0 percent by weight.

3. The process according to claim 2 wherein the concentration of trialkali metal orthophosphate in said solution is from about 0.50 percent by weight to less than about 4.0 percent by weight.

4. The process according to claim 3 wherein the concentration of trialkali metal orthophosphate in said solution is from about 1.0 percent by weight to less than about 4.0 percent by weight.

5. The process according to claim 1 wherein said trialkali metal orthophosphate comprises trisodium orthophosphate.

6. The process according to claim 1 wherein the pH of said treatment solution is greater than about 11.5.

7. The process according to claim 5 wherein the pH of said treatment solution is between about 12 and about 13.5.

8. The process according to claim 1 wherein said treatment solution does not contain alcohol.

9. The process according to claim 1 wherein said poultry, red meat or seafood comprises a poultry carcass and wherein said treatment solution is applied prior to chilling said carcass.

10. The process according to claim 1 wherein said poultry, red meat or seafood comprises red meat and wherein said treatment solution is applied prior to rigor.

11. The process according to claim 1 wherein said poultry, red meat or seafood comprises seafood and wherein said treatment solution is applied after evisceration.

12. The process according to claim 1 wherein the temperature of said solution is between about 100° F. and about 180° F.

13. The process according to claim 13 wherein the temperature of said solution is between about 125° F. and about 175° F.

14. The process according to claim 13 wherein the temperature of said solution is between about 140° F. and about 160° F.

* * * * *